(12) United States Patent
Frey et al.

(10) Patent No.: US 7,162,156 B2
(45) Date of Patent: Jan. 9, 2007

(54) BI-DIRECTIONAL SINGLE FIBER OPTIC LINK FOR DATA AND RADIO FREQUENCY TRANSMISSIONS

(75) Inventors: James E. Frey, Salt Lake City, UT (US); Myren Iverson, Layton, UT (US)

(73) Assignee: L-3 Communication Corporation, New York, NY (US)

( * ) Notice: Subject to any disclaimer, the term of this patent is extended or adjusted under 35 U.S.C. 154(b) by 649 days.

(21) Appl. No.: 09/928,316

(22) Filed: Aug. 13, 2001

(65) Prior Publication Data

US 2003/0030863 A1    Feb. 13, 2003

(51) Int. Cl.
H04J 14/02 (2006.01)
H04B 10/00 (2006.01)
H04B 10/12 (2006.01)

(52) U.S. Cl. .................. 398/115; 398/83; 398/107; 398/113; 398/114; 398/141

(58) Field of Classification Search ............... 398/42, 398/67, 68, 110, 107, 113–117, 141; 342/368; 343/905
See application file for complete search history.

(56) References Cited

U.S. PATENT DOCUMENTS

| 4,977,593 | A  | * | 12/1990 | Ballance ........................ 380/2 |
| 5,339,184 | A  | * | 8/1994  | Tang ........................... 398/116 |
| 5,371,814 | A  | * | 12/1994 | Ames et al. .................. 385/25 |
| 6,198,457 | B1 | * | 3/2001  | Walker et al. ............... 343/840 |
| 6,366,712 | B1 | * | 4/2002  | Buabbud et al. ............. 385/15 |
| 6,477,154 | B1 | * | 11/2002 | Cheong et al. ............. 370/328 |
| 6,674,966 | B1 | * | 1/2004  | Koonen ....................... 398/70 |
| 6,724,523 | B1 | * | 4/2004  | Yap ............................ 359/333 |
| 6,782,199 | B1 | * | 8/2004  | Ye et al. ....................... 398/10 |
| 6,807,374 | B1 | * | 10/2004 | Imajo et al. ................ 398/115 |
| 6,895,185 | B1 | * | 5/2005  | Chung et al. ................ 398/72 |
| 2002/0181668 | A1 | * | 12/2002 | Masoian et al. ........... 379/56.3 |
| 2004/0264446 | A1 | * | 12/2004 | Owens et al. ............... 370/360 |
| 2005/0026588 | A1 | * | 2/2005  | Eddy et al. ................. 455/307 |

\* cited by examiner

Primary Examiner—Dalzid Singh
(74) Attorney, Agent, or Firm—Perman & Green, LLP

(57) ABSTRACT

A data link system comprising a shelter housing sensitive radio frequency equipment and an antenna located apart from the shelter. A single fiber, bi-directional fiber optic link couples the antenna to the shelter. Both RF signals and data signals are sent across the data link.

19 Claims, 5 Drawing Sheets

BI-DIRECTIONAL SINGLE FIBER OPTIC LINK FOR DATA AND RADIO FREQUENCY TRANSMISSIONS

BACKGROUND OF THE INVENTION

1. Field of the Invention

The present invention relates to fiber optic data links and, more particularly, to a fiber optic link between a shelter and antenna radio frequency assembly.

2. Brief Description of Related Developments

Radio frequency ("RF") components, such as for example, X-Band DFS, Ku-Band DFS, Down-converters and Up-converters are susceptible to temperature and moisture, both of which cause problems.

Generally, radio frequency equipment must be designed to operate from −55 to +85 degrees centigrade. In some cases, where radio frequency equipment is designed to less stringent requirements the radio frequency equipment must be located in an environmentally controlled enclosure. This requires the enclosure to be air-conditioned, which is costly. When the radio frequency equipment is located in the enclosure, the radio frequency signals must be sent through Coaxial Cable with significant signal loss. Differing lengths of feed line can require extensive compensating circuitry in the radio frequency electronics ("RFE").

Generally, Data Link systems have sensitive radio frequency equipment, such as for example, synthesizers, up-converters and down-converters mounted on the antenna or in the enclosure at the base of the antenna. The RF components in these systems (X-Band DFS, ku-Band DFS, down-converters and the up-converter) are susceptible to temperature and moisture. When mounted on the antenna or in the enclosure, air-conditioning and environmental protection is required, and the components are not generally located in an easily accessible area.

It would be advantageous to reduce costs in a data link system by reducing the cost of air conditioning or component/equipment design for extreme temperatures, and reduce component failure, troubleshooting and repair time.

SUMMARY OF THE INVENTION

The present invention is directed to a data link system. In one embodiment, the system comprises a shelter housing sensitive radio frequency equipment, and an antenna located apart from the shelter. A single fiber, bi-directional fiber optic link couples the antenna to the shelter. Both RF signals and data signals are sent across the data link.

In one aspect, the present invention is directed to a data link system. In one embodiment, the system comprises a shelter unit housing sensitive radio frequency equipment and an antenna radio frequency assembly. A single fiber, fiber optic link connects the shelter and the antenna radio frequency assembly. Fiber optic joints are adapted to pass the fiber optic link through antenna gimbals and a wavelength division multiplexing system to the antenna radio frequency assembly. The command link radio frequency signals, return link radio frequency signals and status singles are passed over the single fiber.

In another aspect, the present invention is directed to a data link system. In one embodiment, the system comprises a shelter unit housing sensitive radio frequency equipment, an antenna assembly, a radio frequency electronic assembly for housing radio frequency equipment related to the antenna, a single fiber, fiber optic link between the shelter and the antenna assembly. The fiber optic link is limited to two channels, a first channel and a second channel, and the system is adapted to send two signals over each of the first and second channel. Fiber optic rotary joints are adapted to pass the fiber optic link through antenna gimbals to the Radio Frequency Electronics, and command link radio frequency signals, return link radio frequency signals and command/status signals are passed over the single fiber.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
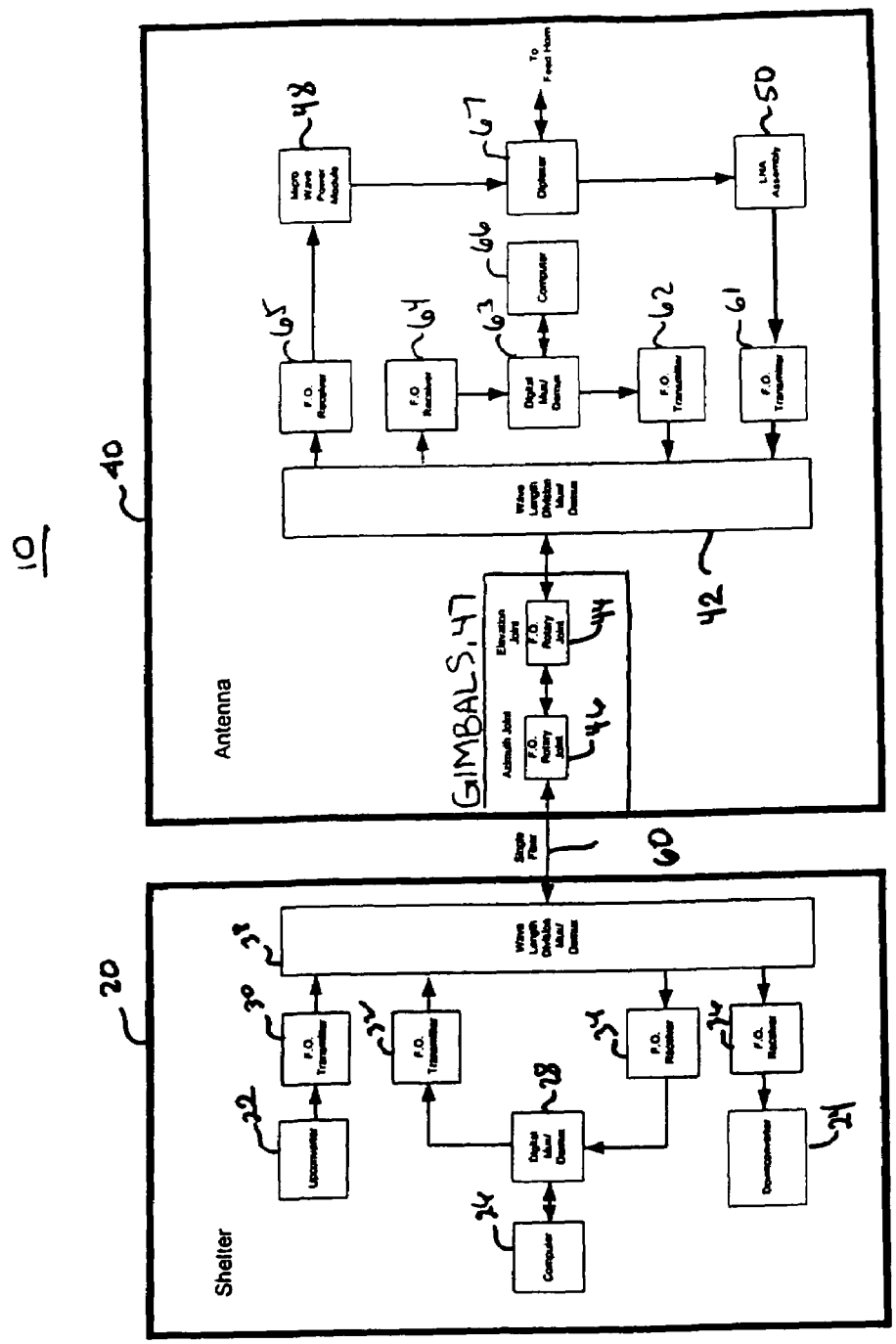
FIG. 1 is a block diagram of a single line fiber optic system incorporating features of the present invention using wavelength division multiplexing.

Referring to FIG. 1, there is shown an exploded perspective view of a system 10 incorporating features of the present invention. Although the present invention will be described with reference to the embodiment shown in the drawings, it should be understood that the present invention can be embodied in many alternate forms of embodiments. In addition, any suitable size, shape or type of elements or materials could be used.

As shown in FIG. 1, the system 10 generally comprises a shelter assembly 20 and an antenna assembly 40. A fiber optic link 60 links the antenna assembly 40 to the shelter assembly 20. The system shown in FIG. 1 is using wavelength division multiplexing. In an alternate embodiment, the system 10 could include other suitable components on system for a bi-directional fiber-optic link in a data link system. It is a feature of the present invention to use a single fiber, fiber optic link 60 between the shelter assembly 20 and the antenna assembly 40 and to send command link RF, Return Link RF, command and status signals over the single fiber. This can reduce electromagnetic interference ("EMI") and increase data security. It is a feature of the present invention to locate the radio frequency equipment in the shelter 20 rather than at the antenna.

Figure 4:
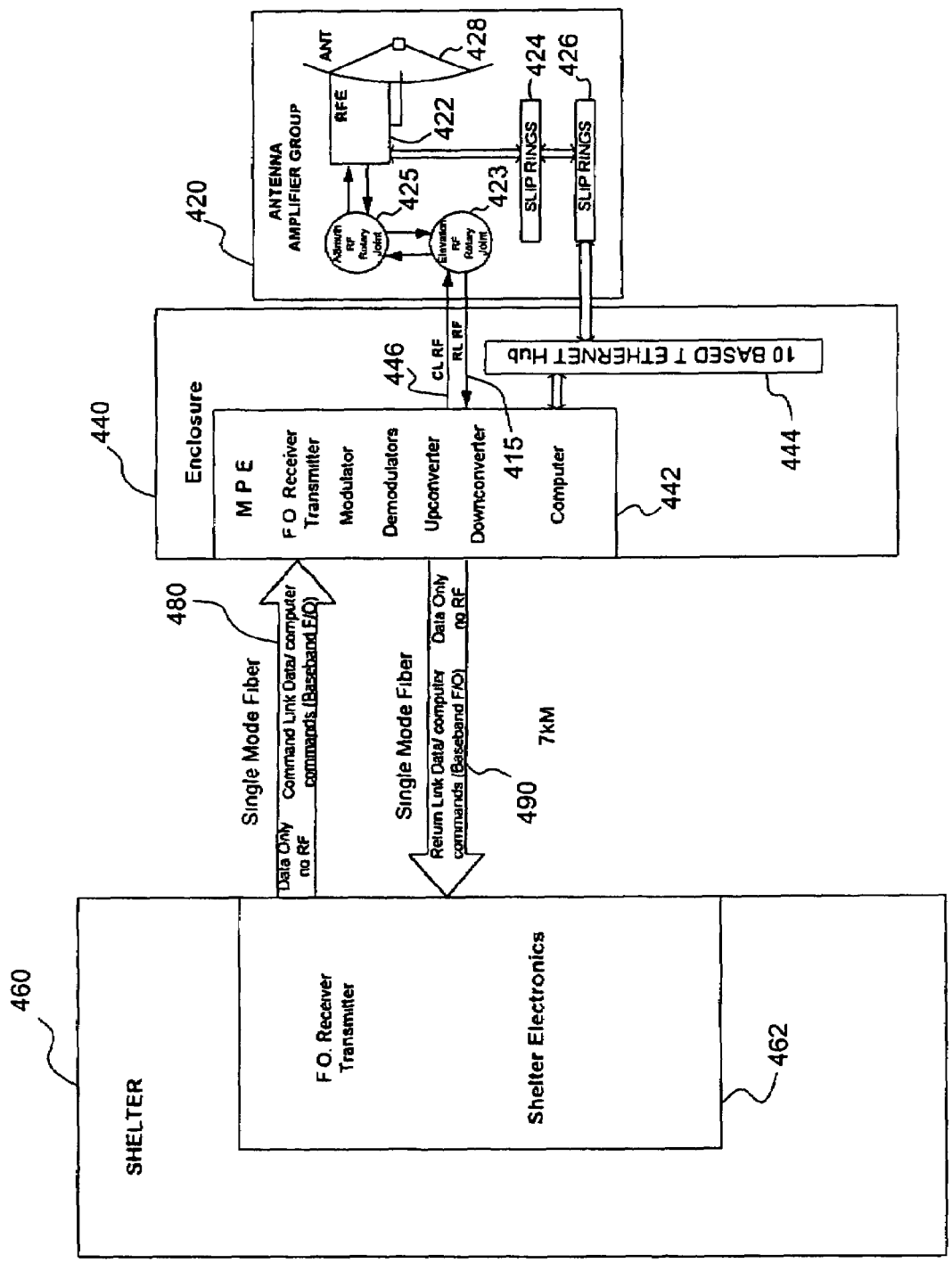
FIG. 4 is a block diagram of signal paths in a MRMU system.
Figure 5:
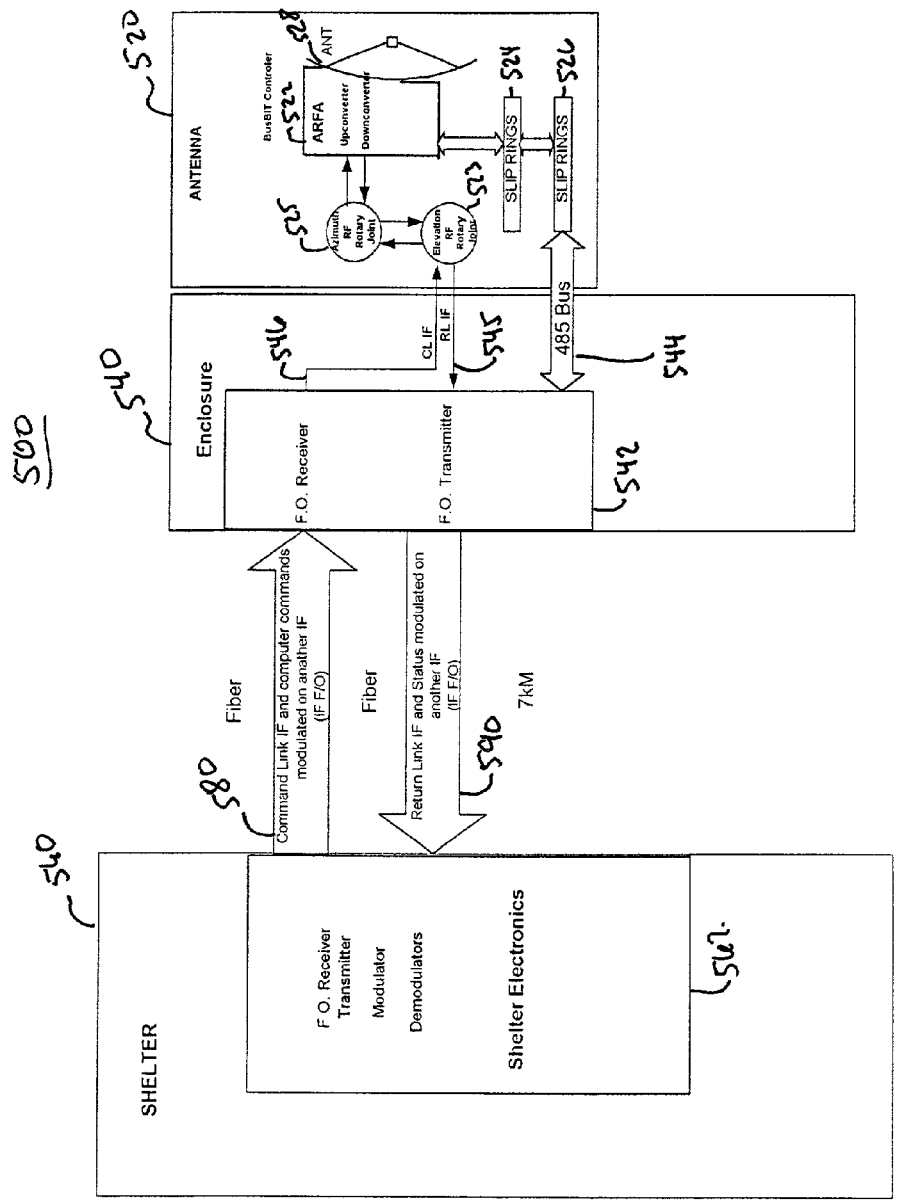
FIG. 5 is a block diagram of signal paths in a MIST system.

Some examples of existing systems where the radio frequency equipment is mounted at the antenna are shown in FIGS. 4 and 5. For example, referring to FIG. 4, an example of the command link, return link and command status (10 based T Ethernet) signal paths in a MRMU system is shown. The fiber optic line is used to send data before it is modulated on the RF. The antenna amplifier group 420 includes an antenna 428, radio frequency equipment 422, RF rotary joints 423 and 425, and slip rings 424, 426. The antenna amplifier group 420 is coupled to an enclosure 440 that includes sensitive radio frequency equipment Modem Processor Electronics (MPE) 442. The radio frequency equipment 442 can include a fiber optic receiver/transmitter, modulator, demodulators, up-converter, down-converter synthesizers and a computer. The return link RF 445 passes from the rotary joint 423 to the MPE 442 and the command link RF 446 passes from the MPE 442 through the rotary joint 423 to the antenna RFE 422. A single mode fiber 490 can be used to carry the return link data/computer status (Baseband fiber optic) from the enclosure 440 to the shelter 460. Only data can pass across the fiber 490, and not RF. A single mode fiber 480 is used to transfer the command link data/computer commands (Baseband F/O) from the shelter 460 to the enclosure 440. Again, only data can be transferred and not RF.

The shelter 460 shown in FIG. 4 includes the shelter electronics 462 and a fiber optic receiver transmitter. In the system shown in FIG. 4, the enclosure 440 is required to be airconditioned and is generally mounted at base of the antenna which can be 5–7 sometimes 10 kilometers from the shelter 460. The distance of the enclosure from the shelter can be problematic if field service needs to be able to access the enclosure 440 for repair and trouble shooting. FIG. 4 does not show the enclosure that is located at the base of the antenna. The enclosure houses motor controls and power supplies.

In another example of an existing system, referring to FIG. 5, the command link, return link and status signal paths in a MIST system are illustrated. The system 500 comprises an antenna assembly 520, an enclosure assembly 540 and a shelter assembly 560. A first fiber optic line 580 is used to pass Command link intermediate frequency ("IF") and computer commands modulated on another IF (IF F/O). A second fiber optic line 590 is needed to pass return link IF and status commands modulated on another IF (IF FIO). The shelter 560 and enclosure 540 are separated by approximately 7 to 10 kilometers and the enclosure 540 is mounted at the antenna 520.

Referring to FIG. 5, the antenna system 520 includes an antenna 528, an antenna radio frequency assembly 522, which can include an up-converter and down-converter, quad frequency synthesis diplexer LNA assembly. RF rotary joints 523 and 525, and slip rings 524, 526 are located on antenna assembly 520. A 485 bus 544 can be used to communicate between the antenna system 520 and enclosure 540. The command link IF 546 is sent from a fiber optic receiver/transmitter 542 through the rotary joint 523 while the return link IF can be sent from the antenna system 520 to the fiber optic receiver transmitter 542. The shelter 560 includes the shelter electronics 562.

Referring to FIG. 1, in the present invention, the link 60 is adapted to carry all radio frequency carriers for command link (up-link) and return link (down-link) and all command and status between the antenna 40 and shelter 20, as well as any other required data. In one embodiment, as shown in FIG. 1, the bi-directional single fiber optic link can use wavelength division multiplexing, illustrated by the wavelength division mux/demux 42, and fiber optic rotary joints 44 and 46 in the antenna assembly 40. The fiber optic rotary joints can include an elevational joint 44 and an azimuth joint 46.

The shelter 20 incorporating features of the present invention shown in FIG. 1 generally includes operator controls, intermediate frequency equipment and digital equipment. In one embodiment of the present invention, the shelter 20 is also adapted to include the sensitive radio frequency equipment, such as for example synthesizers, up-converter 22, down-converter 24, X-Band DFS and ku-Band DFS. In an alternate embodiment, the shelter 20 can include any suitable equipment for a command data link system. Generally, the shelter 20 is adapted to operate at room temperature. It is a feature of the present invention to use components designed to operate in the range of approximately 0 to 50 degrees centigrade, and to place the sensitive RF assemblies in the shelter 20 rather than at the antenna. The fiber optic link 60 of the present invention allows locating the radio frequency equipment in the shelter 20 where conditions are mild and dry. This reduces the cost of air conditioning or equipment design for extreme temperatures at the enclosure or the antenna. Feed line loss is also reduced, which reduces the cost of compensating circuitry in the radio frequency electronics. The conditions in the shelter 20 generally need to be mild and dry because the operators are in the shelter and the shelter 20 can be located at a distance from the antenna assembly 40.

The antenna assembly 40 shown in FIG. 1 is generally the location of the radio frequency power amplifier assemblies 48 and low noise amplifier assemblies 50 (also referred to herein as the "radio frequency assembly" or "radio frequency electronics"), feed horn (not shown) and reflector (not shown). The antenna assembly 40 can also include components such as fiber optic transmitters 61, 62, digital multiplexer/demultiplexer 63, fiber optic receivers 64, 65, computer 66 and diplexer 67. In an alternate embodiment, the antenna assembly 40 could include other suitable components for a fiber optic link for a data link.

The fiber optic rotary joints 44 and 46 in the antenna system 40, pass the link 60 through the antenna gimbals 47 and the wavelength division multiplexing system 42. The present invention thus allows both RF and data to be sent over the link 60. It is a feature of the present invention to provide a fiber optic link 60 from the shelter 20 up through the antenna 40 fiber optic rotary joints 44,46 and locate the sensitive RF components off the antenna and/or out of the enclosure into the shelter 20 where the environment is mild and dry.

Figure 2:
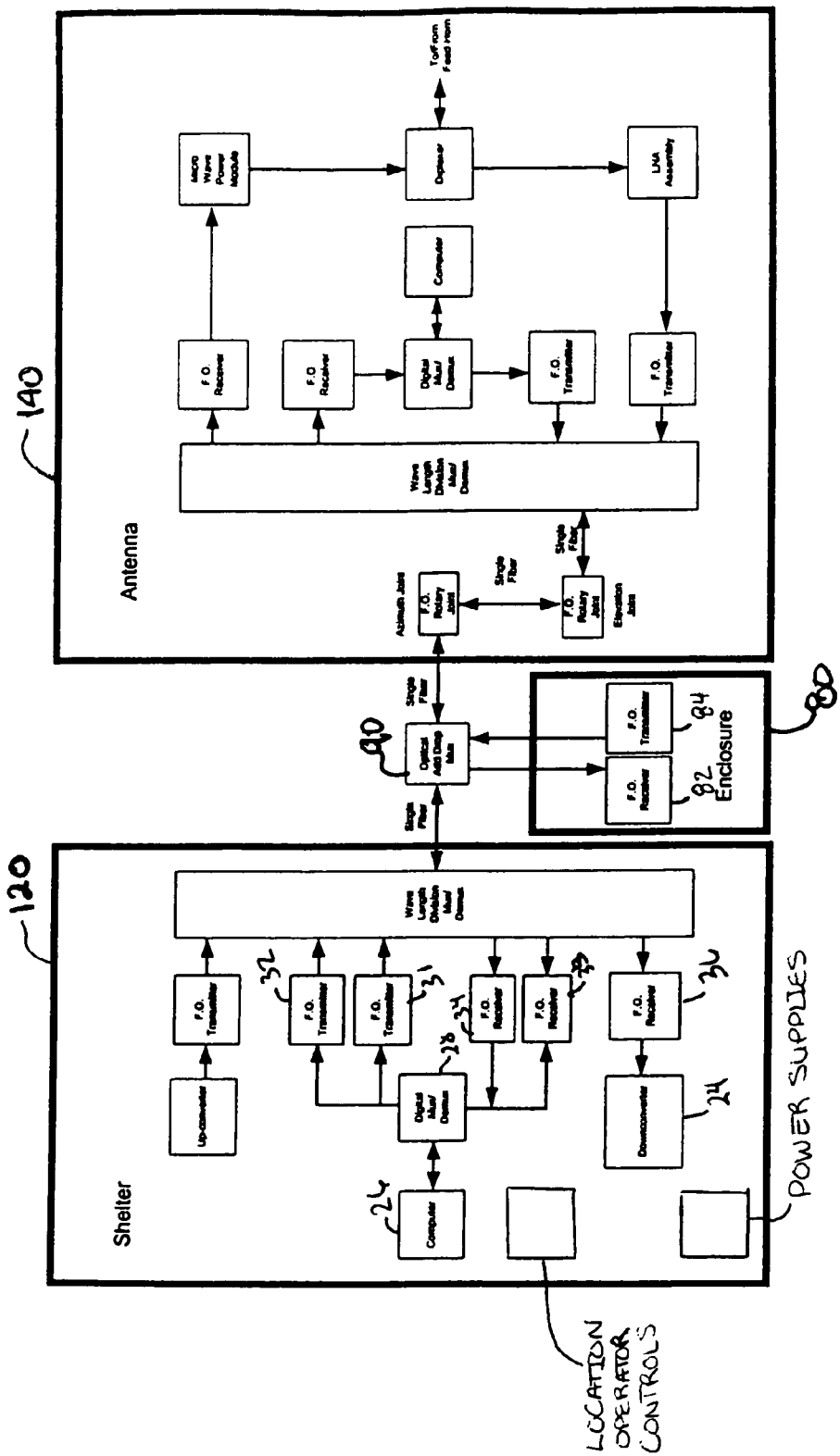
FIG. 2 is a block diagram of a single line fiber optic link system with add/drop at the enclosure incorporating features of the present invention using wave length division multiplexing.

Referring to FIG. 2, in one embodiment, a breakout for the enclosure 80 to allow for control of the antenna motor controls 82, 84 is provided using configurable optical add drop multiplexers 90. The enclosure 80 would also include power supplies (not shown). Generally, the enclosure 80 does not need to be temperature controlled. Fans can be used to move air into or out of the enclosure 80. The enclosure 80 is generally located near the antenna 140. Unlike other systems, air-conditioning in the enclosure is not necessary. This results in savings be reducing air-conditioning expenses, reducing design requirements, reduced component failure, and reduced trouble-shooting and repair time. In one embodiment of the present invention, the enclosure 80 is airconditioned because the synthesizers, up-converters and down-converters are located in the enclosure 80. It is a feature of the present invention to locate the synthesizers, up-converters and downconverters out of the ARFA or enclosure and in the shelter.

As shown in FIG. 2, the RF synthesizer, up-converter and down-converter assemblies are located in the shelter 120, which makes them easily accessible to the operators. In a system incorporating features of the present invention, there is no need for a field service representative to have to go to the enclosure 80 in bad weather or in the dark to work on the assemblies, which can now be located in the shelter 120. The enclosure 80 can be located a distance from the shelter 120, which can be approximately 5 to 10 kilometers. Less costly components can be used in the design of the RF equipment.

Figure 3:
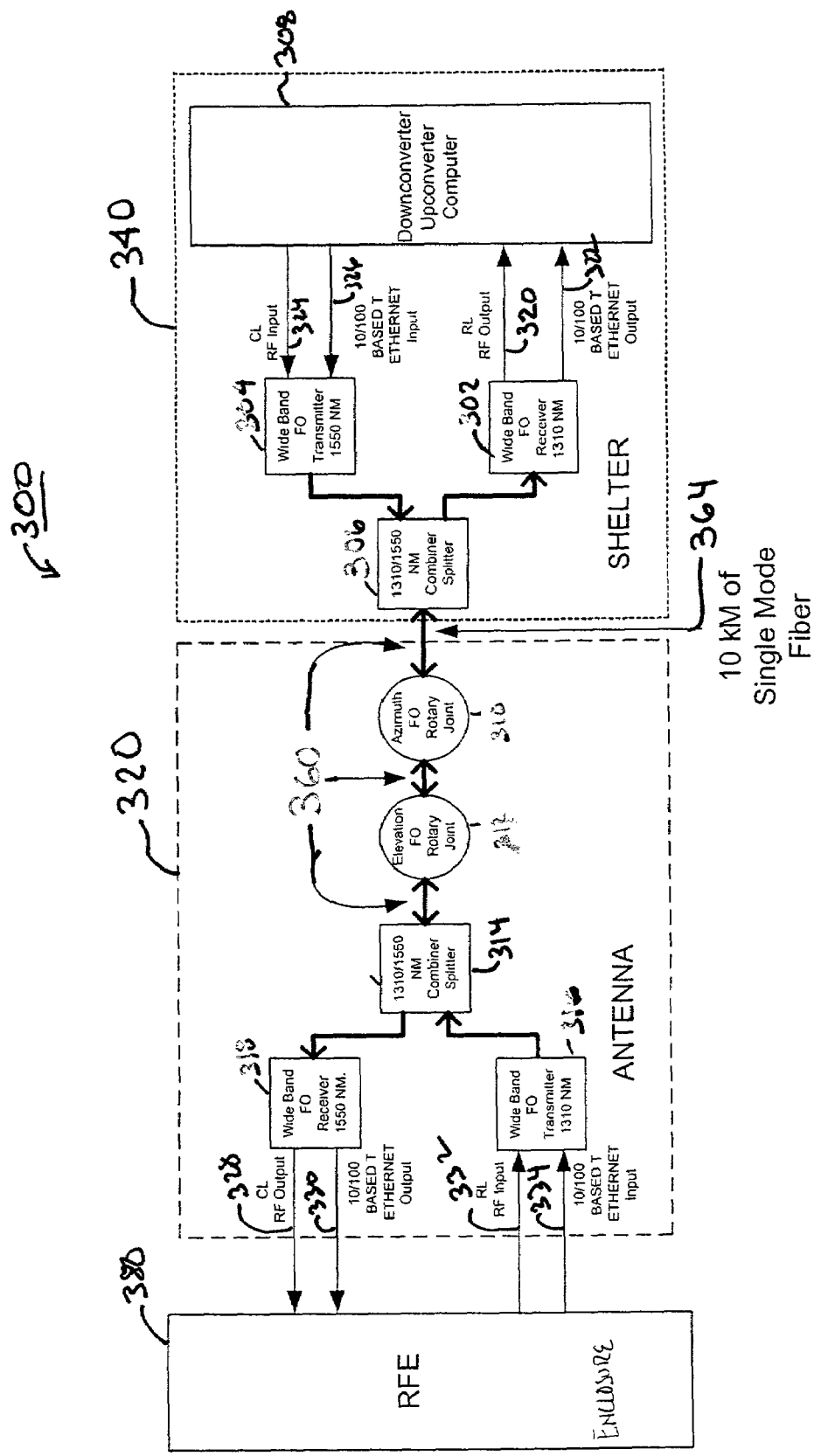
FIG. 3 is a block diagram of an embodiment of a fiber optic link system incorporating features of the present invention using two different wave lengths 1550 and 1310 nm.

Referring to FIG. 3, in one embodiment, a bi-directional single fiber optic link 360 incorporating features of the present invention can be implemented between the shelter 340 and the antenna 320 without using true wavelength division multiplexing. As shown in FIG. 3, the link 360 can be implemented using two completely different wavelength groups, such as for example, 1310 nanometers (nM) and 1550 nanometers (nM).

In the embodiment shown in FIG. 3, the system 300 can be limited to two channels, and can send two signals on each channel. The system 300 can use a transmitter 316 and receiver 302 at 1310 nM, a transmitter 304 and receiver 318 at 1550 nM, in conjuction with 1310/1550 nM splitter combiners 306, 314. The separation 364 between the shelter 340 and the antenna 320 can be approximately 10 kilometers of single mode fiber.

The shelter 340 can also include down-converter/up-converter computer 308. In one embodiment, the down-converter in 308 receives a return link RF output 320 and the computer in 308 receives a 10/100 base T Ethernet output 322 from the wideband 1310 nM fiber optic receiver 302. The up-converter in 308 can also output a command link RF input 324 and the computer in 308 outputs a 10/100 based T Ethernet input 326 to the wideband 1550 nM fiber optic transmitter 304. The antenna system 320 shown in FIG. 3 can include an azimuth fiber optic rotary joint 310 and an elevational fiber optic rotary joint 312. A wideband 1550 nM fiber optic receiver 318 can deliver a command link RF output 328 and a 10/100 based T Ethernet Output 330 to the radio frequency equipment 380. The wideband 1310 nM fiber optic transmitter 316 can transmit a return link RF input 332 and a 10/100 based T Ethernet input 334 from the radio frequency equipment 380.

In a system incorporating features of the present invention, a single fiber, bidirectional fiber optic link is used to couple an antenna assembly to the shelter. This allows the sensitive radio frequency equipment to be stored in the shelter assembly rather than at the antenna assembly. In a system incorporating features of the present invention, the command link RF, return link RF, command and status signals can be transmitted and received over the single fiber. The system of the present invention can reduce electromagnetic interference problems and increase data security.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A data link system comprising:
   a shelter housing radio frequency (RE) equipment that is sensitive to temperature;
   an antenna assembly located apart from the shelter, wherein the antenna assembly includes an amplifier assembly coupled to a feed of an antenna of the antenna assembly, and transmission and/or reception components that do not have the temperature sensitivity of the RF equipment in the shelter;
   a single fiber, bi-directional fiber optic link coupling the antenna to the shelter, wherein both RF signals and data signals can be sent across the data link; and
   fiber optic rotary joints adapted to pass the fiber optic link through antenna gimbals and a wavelength division multiplexing system to the antenna.

2. The system of claim 1 wherein the radio frequency equipment is located a distance from the antenna.

3. The system of claim 1 wherein the system is adapted to use wavelength division multiplexing for the transfer of the RF signals and data signals.

4. The system of claim 1 wherein the system is adapted to send command link RF, return link RF, command and status signals over the fiber optic link.

5. The system of claim 1, wherein components of the antenna assembly includes RF sensitive equipment, the system further comprising a wavelength division multiplexing system located in the shelter and coupling signals passing across the fiber optic link to and from the RF sensitive equipment in the antenna assembly.

6. The system of claim 1 wherein the RF equipment in the shelter includes special transmitters and receivers for different wavelengths of signals passing across the data link.

7. The system of claim 1 wherein the shelter has an environment that is mild and dry.

8. The system of claim 1 wherein equipment of the antenna assembly comprises a radio frequency equipment assembly housing radio frequency equipment for the antenna and being located a distance from the antenna.

9. The system of claim 1 wherein the antenna assembly includes a wavelength division multiplexing system.

10. The system of claim 1 wherein the fiber optic link carries all radio frequency carriers for command link and return link and command and status signals between the antenna assembly and the shelter.

11. A data link system comprising:
    a shelter housing radio frequency (RF) equipment that is sensitive to temperature;
    an antenna assembly located apart from the shelter, wherein the antenna assembly includes an amplifier assembly coupled to a feed of an antenna of the antenna assembly, and transmission and/or reception components that do not have the temperature sensitivity of the RF equipment in the shelter;
    a single fiber, bi-directional fiber optic link coupling the antenna to the shelter, wherein both RF signals and data signals can be sent across the data link; and
    an enclosure for an antenna motor control and power supplies, the enclosure including configurable optical add drop multiplexers adapted to couple equipment in the enclosure to the antenna assembly and to the shelter.

12. A data link system adapted to carry command link and return link command and status comprising:
    a shelter housing radio frequency equipment (RF) that is sensitive to temperature;
    an antenna assembly located away from the shelter, the antenna assembly having radio frequency components that do not have the temperature sensitivity of the RF equipment in the shelter;
    a single fiber, fiber optic link connecting the shelter and the antenna radio frequency assembly; and
    an enclosure coupled to the fiber optic link, and located between the shelter and the antenna assembly, the enclosure including antenna motor controls and configurable add/drop multiplexers optically coupled to the fiber optic link.

13. The system of claim 12 further comprising fiber optic rotary joints in the antenna assembly adapted to pass the fiber optic link through antenna gimbals and a wavelength division multiplexing system to the antenna radio frequency assembly, wherein command link radio frequency signals, return link radio frequency signals and status signals are passed over the single fiber.

14. The system of claim 12 wherein the shelter further includes location operator controls, intermediate frequency equipment and power supplies and is located a distance from the antenna radio frequency assembly.

15. The system of claim 12 wherein the antenna and the shelter are separated by approximately 10 kilometers of single mode fiber.

16. A data link system comprising:
   a shelter housing radio frequency (RF) equipment that is sensitive to temperature;
   an antenna assembly, wherein the antenna assembly includes an amplifier assembly coupled to a feed of an antenna of the antenna assembly, and transmission and/or reception components that do not have the temperature sensitivity of the RF equipment in the shelter;
   a radio frequency electronic assembly for housing radio frequency equipment related to the antenna;
   a single fiber, fiber optic link between the shelter and the antenna assembly, wherein the fiber optic link is limited to two channels, a first channel and a second channel, and wherein the system is adapted to send two signals over each of the first and second channel; and
   fiber optic rotary joints adapted to pass the fiber optic link through antenna gimbals to the radio frequency equipment, wherein command link radio frequency signals, return link radio frequency signals and command/status signals are passed over the single fiber.

17. The system of claim 16 wherein the first channel is adapted to operate at a wavelength of 1310 nanometers and the second channel is adapted to operate at a wavelength of 1550nanometers.

18. The system of claim 16 wherein the shelter further includes a transmitter operating at 1550 nanometers, a receiver operating at 1310 nanometers and a combiner splitter for 1310/1550 nanometers, and wherein the antenna includes a receiver operating at 1550 nanometers, a transmitter operating at 1310 nanometers and a combiner splitter for 1310/1550nanometers.

19. The system of claim 16 wherein the system is adapted to carry both radio frequency signals and data signals across the data link.

* * * * *